(12) United States Patent
Lee et al.

(10) Patent No.: US 12,548,189 B2
(45) Date of Patent: Feb. 10, 2026

(54) METHOD FOR GENERATING THREE-DIMENSIONAL MAP AND METHOD FOR DETERMINING POSE OF USER TERMINAL BY USING GENERATED THREE-DIMENSIONAL MAP

(71) Applicant: SK TELECOM CO., LTD., Seoul (KR)

(72) Inventors: Seongsoo Lee, Seoul (KR); Taekyeong Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 271 days.

(21) Appl. No.: 18/117,743

(22) Filed: Mar. 6, 2023

(65) Prior Publication Data
US 2023/0206492 A1   Jun. 29, 2023

Related U.S. Application Data

(63) Continuation of application No. PCT/KR2021/010988, filed on Aug. 19, 2021.

(30) Foreign Application Priority Data

Oct. 30, 2020 (KR) .................. 10-2020-0143252
Aug. 4, 2021 (KR) .................. 10-2021-0102721

(51) Int. Cl.
*G06T 7/73* (2017.01)
*G06T 3/60* (2024.01)

(52) U.S. Cl.
CPC .............. *G06T 7/74* (2017.01); *G06T 3/60* (2013.01); *G06T 2200/04* (2013.01); *G06T 2207/20084* (2013.01); *G06T 2207/30244* (2013.01)

(58) Field of Classification Search
None
See application file for complete search history.

(56) References Cited

U.S. PATENT DOCUMENTS

2013/0230214 A1   9/2013   Arth et al.
2019/0057299 A1   2/2019   Kutliroff
2020/0320738 A1*  10/2020  Kim ................ G06F 16/587

FOREIGN PATENT DOCUMENTS

CN   106595659 A      4/2017
CN   110148178 A  *   8/2019   .............. G01P 15/18
(Continued)

OTHER PUBLICATIONS

PCT International Search Report and Written Opinion, PCT Application No. PCT/KR2021/010988, Nov. 23, 2021, 12 pages.
(Continued)

*Primary Examiner* — SJ Park
*Assistant Examiner* — Caroline E. Depalma
(74) *Attorney, Agent, or Firm* — WTA IP Law P.C.

(57) ABSTRACT

In accordance with an aspect of the present disclosure, there is provided a method of determining a pose of a camera included in a user terminal. The method comprises, based on whether a first pose of the camera is validly predicted in a first query image in which a location of the user terminal is captured by the user terminal, determining a prediction mode for predicting a second pose of the camera in a second query image in which the location is captured by the user terminal after the first query image; and determining the second pose based on the determined prediction mode.

16 Claims, 12 Drawing Sheets

(56) References Cited

FOREIGN PATENT DOCUMENTS

| | | |
|---|---|---|
| CN | 110458889 A | 11/2019 |
| CN | 110555901 A | 12/2019 |
| CN | 111623773 A | 9/2020 |
| KR | 10-2016-0068815 A | 6/2016 |
| KR | 10-2020-0105157 A | 9/2020 |
| KR | 10-2020-0118677 A | 10/2020 |
| WO | WO 2019169540 A1 | 9/2019 |

OTHER PUBLICATIONS

Office Action of the corresponding Chinese Patent Application No. 202180073278.X dated Nov. 22, 2025.

\* cited by examiner

FIG.4A
FIG.4B
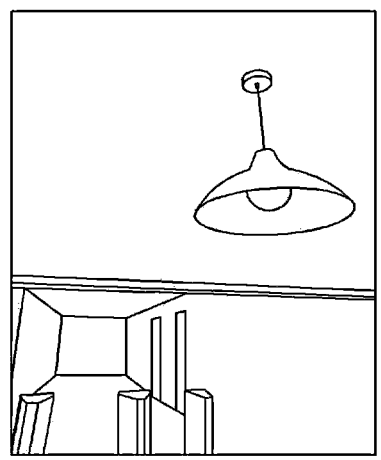
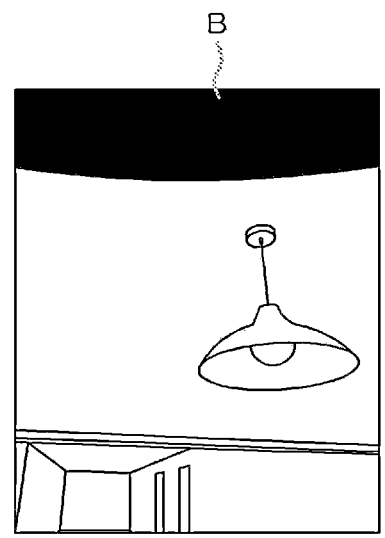

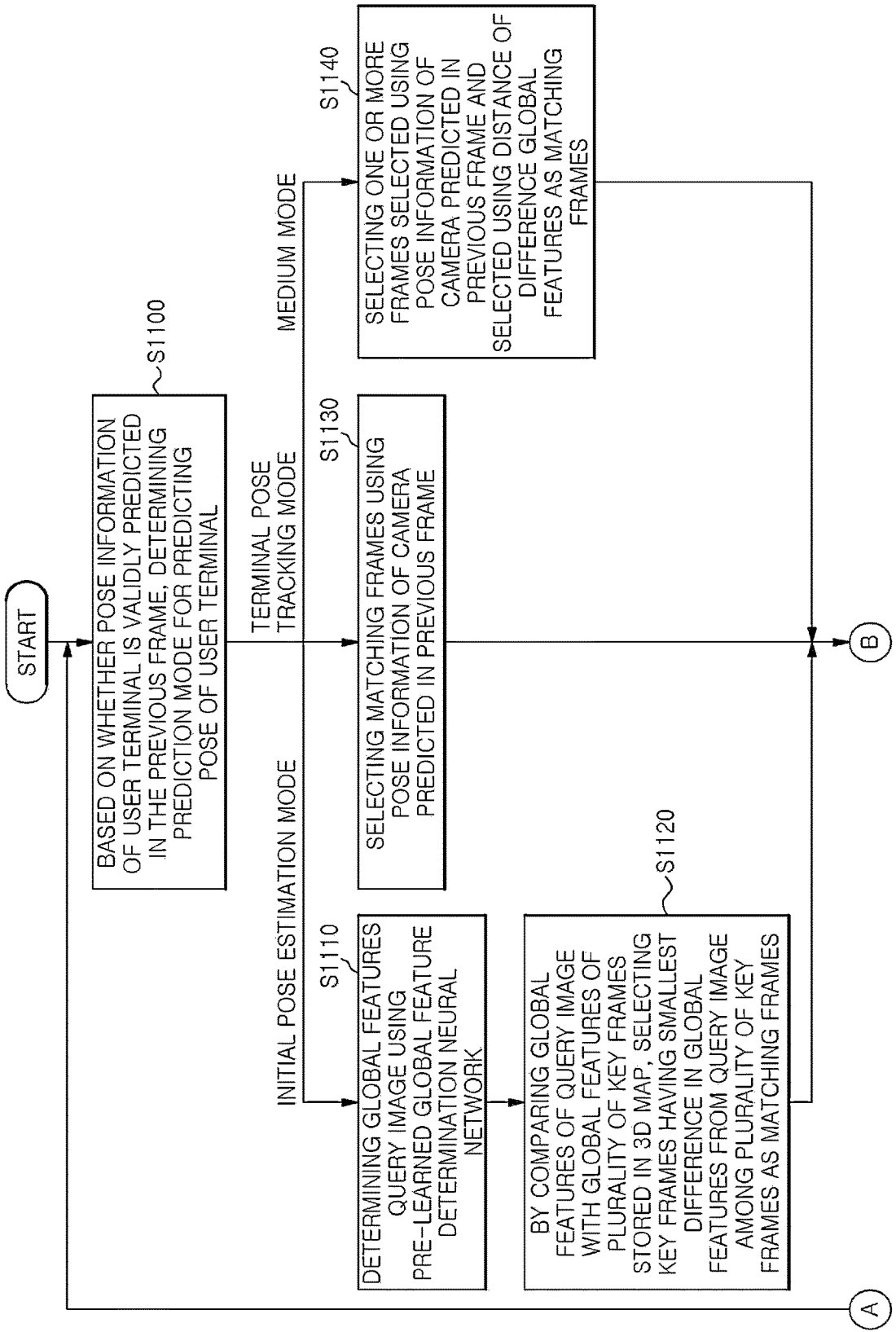

METHOD FOR GENERATING THREE-DIMENSIONAL MAP AND METHOD FOR DETERMINING POSE OF USER TERMINAL BY USING GENERATED THREE-DIMENSIONAL MAP

CROSS-REFERENCE TO RELATED APPLICATIONS

This is a bypass continuation of International PCT Application No. PCT/KR2021/010988, filed on Aug. 19, 2021 which claims priority to Republic of Korea Patent Application No. 10-2020-0143252, filed on Oct. 30, 2020 and Republic of Korea Patent Application No. 10-2021-0102721, filed on Aug. 4, 2021, which are incorporated by reference herein in their entirety.

TECHNICAL FIELD

The present disclosure relates to a method for generating a 3D map and a method for determining a pose of a user terminal using the generated 3D map.

BACKGROUND

In general, GPS information is used to measure the location of a user terminal in a navigation application or the like.

However, location measurement using GPS information is not possible in GPS shaded areas such as tunnels. Methods of measuring the location of a user terminal in GPS shaded areas include a radio wave-based positioning method (e.g., positioning based on base station/AP location and signal strength, positioning based on signal arrival time difference or incident angle, positioning based on signal pattern matching in grid units), a positioning method using a camera, a positioning method using a lidar sensor, and the like.

Among them, as a positioning method for a user terminal such as a smartphone, a radio wave-based positioning method using a smartphone and a positioning method using a camera are suitable. The positioning method using a camera has relatively high positioning accuracy, but it is necessary to build a 3D map with a large data capacity in advance, and there is a problem that the amount of computation for location measurement is large.

SUMMARY

The problem to be solved by the present disclosure is to provide a method for generating a 3D map using a key frame selected from among images taken of a place where a user terminal is located and determining pose information in the current frame based on whether valid pose information is obtained from a previous frame.

In accordance with an aspect of the present disclosure, there is provided a method of determining a pose of a camera included in a user terminal. The method comprises, based on whether a first pose of the camera is validly predicted in a first query image in which a location of the user terminal is captured by the user terminal, determining a prediction mode for predicting a second pose of the camera in a second query image in which the location is captured by the user terminal after the first query image; and determining the second pose based on the determined prediction mode.

Herein, the determining of the second pose comprises: when the first pose is validly predicted, selecting, using the first pose, one or more matching frames from among a plurality of key frames, included in a pre-generated 3D map and in which the location is captured, as matching candidates for the second query image.

Herein, the determining of the second pose further comprises: when the first pose is validly predicted, performing local feature matching between first local features extracted from the second query image and second local features included in the one or more matching frames; and determining the second pose of the second query image further based on a result of the local feature matching.

Herein, the determining of the second pose comprises: if the first pose is not validly predicted, determining global features of the second query image using a pre-learned neural network; and by comparing the global features of the second query image with global features of each of a plurality of key frames included in a pre-generated 3D map and in which the location is captured, selecting one or more matching frames from among a plurality of key frames as matching candidates with the second query image.

Herein, the determining of the second pose comprises: if the first pose is validly predicted, but satisfies a preset condition, selecting one or more frames from among a plurality of key frames, included in a pre-generated 3D map and in which the location is captured, by comparing global features of the second query image determined using a pre-learned neural network with global features of each of the plurality of key frames, and one or more frames from among the plurality of key frames using the first pose, as matching frames, and the preset condition comprises: at least one of a case that the number of validly predicted poses of the camera are equal to or greater than a preset threshold number, and a case that a distance difference between the second pose determined according to the prediction mode when the first pose is validly predicted and the second pose determined according to the prediction mode when the first pose is not validly predicted is equal to or greater than a preset threshold distance.

Herein the determining of the second pose comprises: selecting one or more matching images that match with the second query image from among a plurality of key frames included in the pre-generated 3D map and in which the location is captured; and determining the second pose of the second query image by using local feature matching between local features included in the one or more matching images and local features included in the second query image, and herein the 3D map is generated using a plurality of key frames selected using a predetermined criterion from among images in which the location is captured by a location capturing device or a terminal pose determining device, and the predetermined criterion includes at least one of a time interval and a moving distance of the location capturing device or the terminal pose determining device.

Herein, the 3D map is generated by further using an image generated by rotating at least one of the plurality of key frames at one or more angles.

Herein, the determining of the second pose comprises: performing local feature matching between first local features extracted from the second query image and second local features included in the pre-generated 3D map and included in one or more key frames in which the location is captured; and determining the second pose of the second query image using a result of the local feature matching, and wherein when calculating a distance between the first local features and local features matching with each of the first local features among a plurality of local features included in each of the one or more key frames, the second local features are local features having the shortest distance.

Herein the performing local feature matching comprises: performing the local feature matching only for a predetermined number of matching pairs in the order of shortest calculated distances between the first local features and the second local features among matching pairs of the first local features and the second local features.

The method further comprises: obtaining, from the user terminal, information on whether the first pose was validly predicted, the first pose information, information on the last pose of the user terminal predicted when the previous query image was not validly predicted, and the number of images it is determined that a pose is validly predicted among previous images, together with the second query image.

The method further comprises: obtaining, from the user terminal, information on whether the second pose was validly predicted, and a number of images it was determined that the pose was validly predicted in the second query image and images before the second query image, together with the second pose.

In accordance with another aspect of the present disclosure, there is provided a device for determining a terminal pose. The device comprising: a transceiver configured to receive a first query image in which a location where a user terminal is captured, from a user terminal; and a processor configured to determine a prediction mode for predicting a second pose of a camera in a second query image, received from the user terminal after the first query image and in which the location is captured, based on whether a first pose of the camera of the user terminal is validly predicted in the first query image, and determine the second pose based on the determined prediction mode.

Herein, when the first pose is validly predicted, the processor is further configured to select, using the first pose, one or more matching frames from among a plurality of key frames, included in a pre-generated 3D map and in which the location is captured, as matching candidates for the second query image.

Herein, when the first pose is not validly predicted, the processor is further configured to determine global features of the second query image using a pre-learned neural network, and select one or more matching frames from among the plurality of key frames as matching candidates by comparing the global features of the second query image and global features of each of a plurality of key frames included in a pre-generated 3D map and in which the location is captured.

Herein when the first pose is validly predicted but satisfies a preset condition, the processor is further configured to select one or more frames from among a plurality of key frames, included in a pre-generated 3D map and in which the location is captured, by comparing global features of the second query image determined using a pre-learned neural network with global features of each of the plurality of key frames, and one or more frames from the plurality of key frames using the first pose, as matching frames with the second query image, and the preset condition comprises at least one of a case that the number of validly predicted poses of the camera are equal to or greater than a preset threshold number, and a case that a distance difference between the second pose determined according to the prediction mode when the first pose is validly predicted and the second pose determined according to the prediction mode when the first pose is not validly predicted is equal to or greater than a preset threshold distance.

In accordance with still another aspect of the present disclosure, there is provided a non-transitory computer-readable storage medium for storing computer program programmed to perform a method of determining a pose of a camera included in a user terminal. The method comprises: based on whether a first pose of the camera is validly predicted in a first query image in which a location of the user terminal is captured by the user terminal, determining a prediction mode for predicting a second pose of the camera in a second query image in which the location is captured by the user terminal after the first query image; and determining the second pose based on the determined prediction mode.

According to an embodiment of the present disclosure, a data capacity of a 3D map can be reduced by generating a 3D map using a key frame selected from among images taken of a place where a user terminal is located.

In addition, according to an embodiment of the present disclosure, when valid pose information is obtained in the previous frame, global feature matching is not performed and the number of local features used for local feature matching is reduced, thereby reducing the amount of computation used to obtain pose information of the user terminal.

BRIEF DESCRIPTION OF THE DRAWINGS

FIGS. 4A and 4B show an example of generating an image by rotating a key frame according to an embodiment of the present disclosure.

FIGS. 12A and 12B are flowcharts illustrating a method of generating a 3D map included in a user terminal according to an embodiment of the present disclosure.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
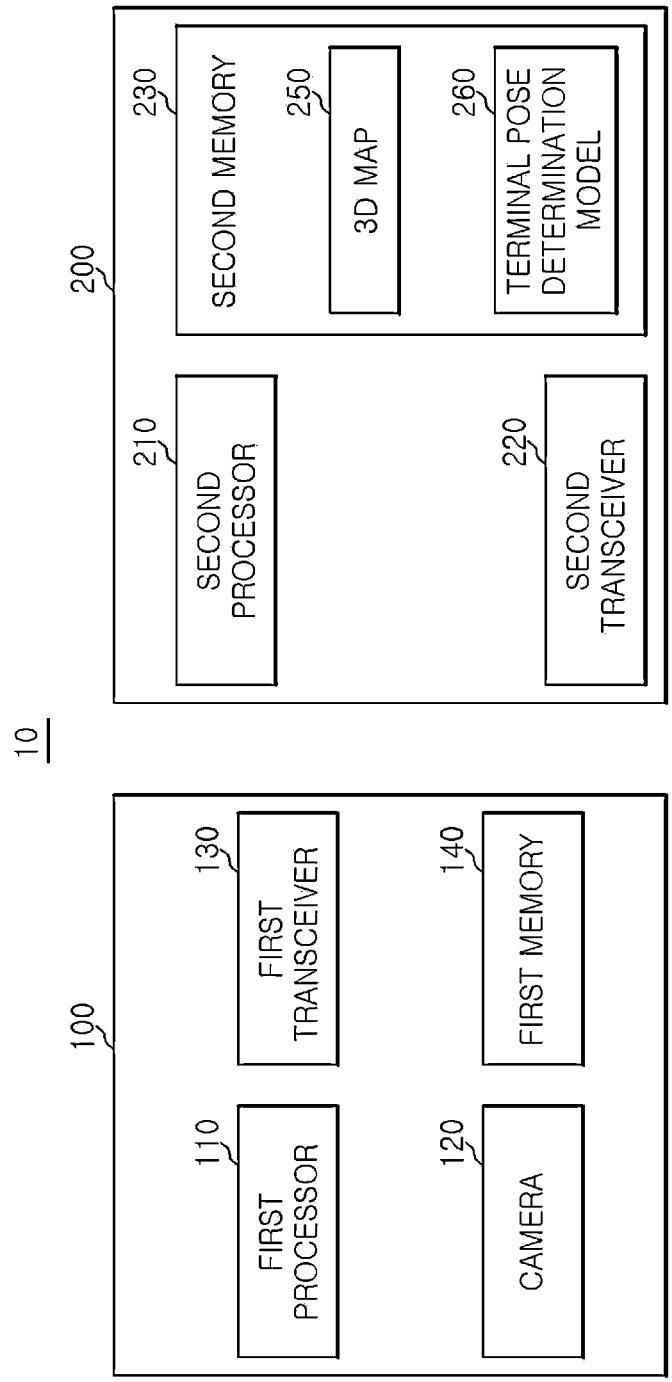
FIG. 1 is a block diagram showing a system for determining a terminal pose according to an embodiment of the present disclosure.

FIG. 1 is a block diagram showing a system for determining a terminal pose according to an embodiment of the present disclosure.

Referring to FIG. 1, a terminal pose determination system 10 may include a user terminal 100 and a terminal pose determination device 200.

The user terminal 100 may include a first processor 110, a camera 120, a first transceiver 130 and a first memory 140.

The first processor 110 may control overall functions of the user terminal 100.

The camera 120 may capture an image of surroundings of the user terminal 100.

The first transceiver 130 may transmit an image captured using the camera 120 to the terminal pose determination device 200 and receive information about the location of the user terminal 100 from the terminal pose determination device 200.

According to the embodiment, the first transceiver 130 may transmit information on whether pose information is validly predicted in the previous (immediately previous) frame, pose information in the previous (immediately previous) frame, pose information of the user terminal 100 estimated immediately before operating in the terminal pose tracking mode (i.e., pose information of the most recent user terminal 100 estimated in the initial pose estimation mode), and the number of operations in the terminal pose tracking mode (e.g., a continuous number or a discontinuous number of times), together with an image captured using the camera 120.

The first memory 140 may capture an image using the camera 120, transmit the image to the terminal pose determination device 200 using the first transceiver 130, and store one or more models for receiving information on the location of the user terminal 100 from the terminal pose determination device 200.

In this specification, 'model' refers to software (computer program code) or a set thereof for performing functions of each device, and may be implemented by a series of commands.

The first processor 110 may execute the one or more programs stored in the first memory 140, capture an image, transmit the captured image to the terminal pose determination device 200, and receive the information on the location of the user terminal 100 from the terminal pose determination device 200.

The terminal pose determination device 200 may predict pose information of the user terminal 100 using an image received from the user terminal 100 and a pre-stored 3D map.

In this specification, the pose information may include information about the position and direction of the user terminal 100 (i.e., the position and direction of the camera 120 included in the user terminal 100). For example, the pose information may be expressed using 6 degrees of freedom (DOF) (that is, position information including X, Y, and Z, and rotation information including pitch, roll, and yaw).

According to the embodiment, the device pose determination device 200 may be implemented as a server (e.g., a cloud server), but it is not limited thereto. That is, the terminal pose determination device 200 may be implemented as any device that predicts pose information of the user terminal 100 by receiving an image from the user terminal 100.

The terminal pose determination device 200 may include a second processor 210, a second transceiver 220 and a second memory 230.

The second processor 210 may control overall functions of the terminal pose determination device 200.

The second transceiver 220 may receive an image captured using the camera 120 from the user terminal 100 and transmit pose information of the user terminal 100 predicted using the terminal pose determination model 260 to the user terminal 100.

The second memory 230 may store the 3D map 250 and the terminal pose determination model 260.

The second processor 210 may predict pose information of the user terminal 100 from the image received from the user terminal 100 and the 3D map 250 by executing the terminal pose determination model 260.

A method of generating the 3D map 250 using the 3D map generation device will be described in detail with reference to FIG. 2, and the functions of the terminal pose determination model 260 will be described in detail with reference to FIG. 3.

In this specification, it is described that the 3D map 250 is stored in the second memory 230 for convenience of description, but it is not limited thereto. That is, the terminal pose determination system 10 may include a database (not shown) distinct from the terminal pose determination device 200, and the 3D map 250 may be stored in the database (not shown). In this case, the terminal pose determination device 200 may receive the 3D map 250 from the database (not shown) and predict pose information of the user terminal 100.

Figure 2:
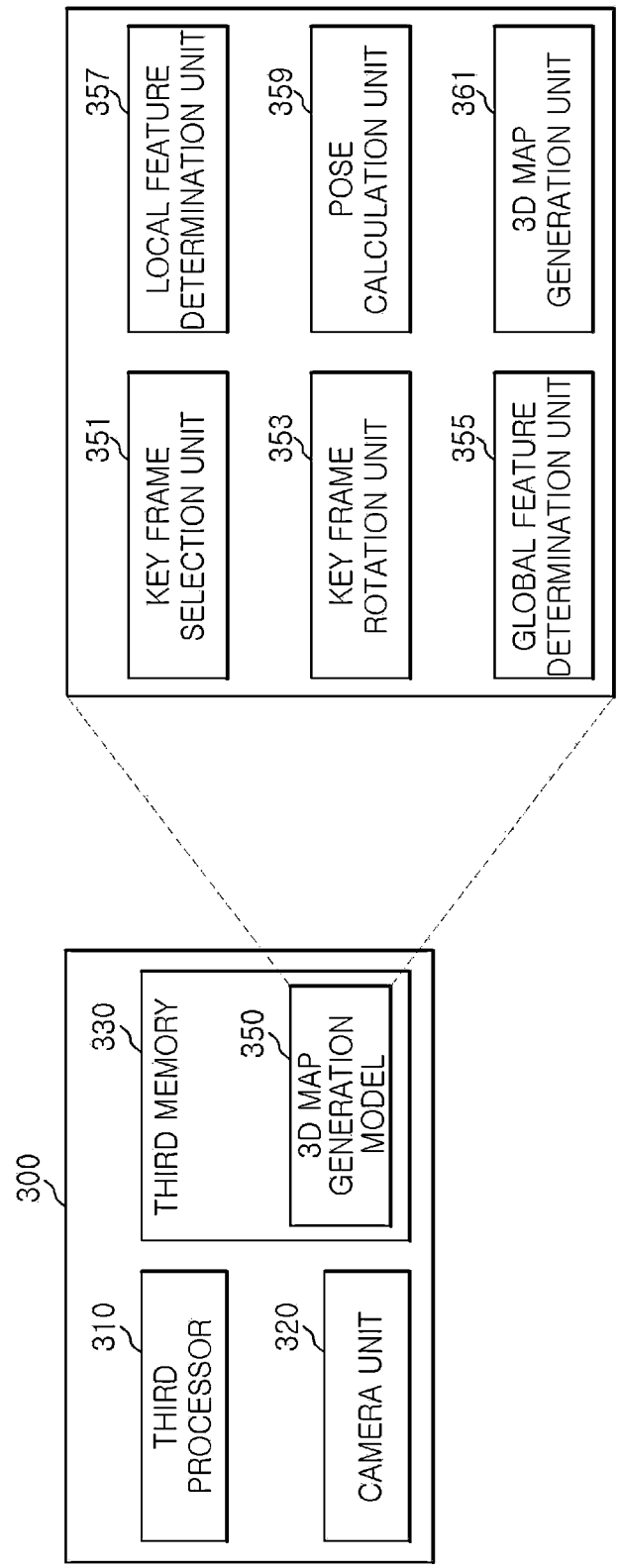
FIG. 2 is a block diagram illustrating a 3D map generating apparatus for generating a 3D map according to an embodiment of the present disclosure.

FIG. 2 is a block diagram illustrating a 3D map generation device for generating a 3D map according to an embodiment of the present disclosure.

Referring to FIGS. 1 and 2, the 3D map generation device 300 may include a third processor 310, a camera unit 320 and a third memory 330.

According to the embodiment, the 3D map generation device 300 may be the same as the terminal pose determination device 200, but it is not limited thereto. That is, the terminal pose determination device 200 may generate the 3D map 250 and determine the pose information of the camera 120 included in the user terminal 100 using the generated 3D map 250. According to the embodiment, the 3D map generation device 300 may generate the 3D map 250, and the terminal pose determination device 200 may determine pose information of the camera 120 included in the user terminal 100 using the 3D map 250 generated by the 3D map generation device 300.

The third processor 310 may control overall functions of the 3D map generation device 300.

The camera unit 320 may include one or more cameras. The camera unit 320 may generate an image of a place where the 3D map is to be produced using the one or more cameras.

According to the embodiment, when the camera unit 320 includes a plurality of cameras, the plurality of cameras may be installed to face different directions so as to take images in 360-degree of the location.

In this specification, for convenience of description, it is described that the 3D map generation device 300 captures the place using one or more cameras included in the camera unit 320, but it is not limited thereto. That is, according to the embodiment, the 3D map generation device 300 may not include the camera unit 320, and in this case, the 3D map generation device 300 may receive (may be input) an image captured by an external camera unit.

Also, according to the embodiment, the 3D map generation device 300 may include a sensor unit (not shown) in addition to the camera unit 320. According to the embodiment, the sensor unit (not shown) may include LiDar. The 3D map generation device 300 may generate an image of the place and information on features included in the image by using the camera unit 320 and a sensor unit (not shown).

The third memory 330 may store the 3D map generation model 350.

The third processor 310 may execute the 3D map generation model 350 to generate a 3D map including an image of the location and information on feature points included in the image.

The 3D map generation model 350 may include a key frame selection unit 351, a key frame rotation unit 353, a global feature determination unit 355, a local feature determination unit 357, a pose calculation unit 359, and a 3D map generation unit 361.

A key frame selection unit 351, a key frame rotation unit 353, a global feature determination unit 355, a local feature determination unit 357, a pose calculation unit 359, and a 3D map generation unit 361 shown in FIG. 2 are a conceptual division of the functions of the 3D map generation model 350 in order to easily explain the functions of the 3D map generation model 350, but it is not limited thereto. That is, according to embodiments, the functions of the key frame selection unit 351, the key frame rotation unit 353, the global feature determination unit 355, the local feature determination unit 357, the pose calculation unit 359, and the 3D map generation unit 361 may be merged/separated, and may be implemented as a series of commands included in one or more programs.

The key frame selection unit 351 may select key frames used to create the 3D map from among a plurality of frames included in an image captured using the camera unit 320.

In more detail, the 3D map generation device 300 may capture the image while moving in a zigzag manner to a place where the 3D map is to be created, and the key frame selection unit 351 may select the key frames according to predetermined criteria.

The predetermined criteria may include a time interval and a movement distance of the 3D map generation device 300.

That is, among the frames included in the image captured by the 3D map generation device 300, some adjacent frames may be frames of substantially the same scene, depending on the moving speed of the 3D map generation device 300. Accordingly, the key frame selection unit 351 may select key frames according to predetermined criteria so as not to generate the 3D map 250 using overlapping frames.

The key frame rotation unit 353 may generate one or more images by rotating the key frames selected by the key frame selection unit 351 at one or more angles, and use the generated images as key frames.

This is because, even if a plurality of cameras are used to capture an image, there is a limit to capturing the place in all directions, and if the change in view between images captured at the same time is large, the performance of recognition is degraded. When the key frame rotation unit 353 uses images that rotate one frame in various directions as a key frame, the non-captured area between the frames is minimized, and the rotated images and the original frame are captured in the same position, thereby preventing degradation of recognition performance.

To this end, the key frame rotation unit 353 may rotate the selected key frames at one or more angles using Equation 1 below.

$$m'=KRK^{-1}m \qquad \text{[Equation 1]}$$

Here, K may represent a preset parameter inside the camera, R may represent a rotation transformation matrix, m may represent coordinates of the key frame before rotation, and m' may represent coordinates of the key frame after rotation.

That is, the key frame rotation unit 353 may generate an image obtained by rotating the selected key frames using a preset parameter inside the camera and a preset rotation transformation matrix.

For example, further referring to FIGS. 4A and 4B, FIG. 4A shows a key frame selected by the key frame selection unit 351 according to a predetermined criterion, and FIG. 4B shows an image that the key frame rotation unit 353 rotates the key frame using Equation 1.

When a key frame is selected as shown in FIG. 4A, the key frame rotation unit 353 may generate an image of FIG. 4B by rotating the key frame upward by a predetermined angle. However, if the size of the key frame before rotation and the size of the image after rotation are the same, the area B not included in the key frame due to the rotation of the key frame may be included in the image after rotation of the key frame. At this time, the area B not included in the key frame may be expressed in black as shown in FIG. 4B.

The key frame selected by the key frame selection unit 351 and the key frame generated by the key frame rotation unit 353 (hereinafter referred to as a key frame) may include global feature information, one or more local feature information, and pose information.

As described below, global feature information, local feature information, and pose information included in the key frame may be determined by a global feature determination unit 355, a local feature determination unit 357, and a pose calculation unit 359.

First, the global feature determination unit 355 may determine a global feature expressed as a high-dimensional vector of the key frame. The global feature may be a kind of identifier for distinguishing the key frame from other key frames.

According to the embodiment, the global feature determination unit 355 may include a pre-learned global feature determination neural network (e.g., NetVLAD) to output global features of the input key frame when a key frame is input. In this case, the global feature determination unit 355 may determine the global feature using a vector output from the global feature determination neural network when a key frame is input to the previously learned global feature determination neural network.

A method of training the global feature determination neural network included in the global feature determination unit 355 will be described with reference to FIGS. 8A and 8B.

The local feature determination unit 357 may extract one or more local features included in the key frame and determine a high-dimensional vector representing location information and descriptor information of the local features.

The location information may include a location (2D location) of the local feature on the key frame and an absolute location (e.g., (x, y, z) coordinates on the earth) (3D location) of the local feature.

In addition, the descriptor information is for distinguishing the local feature from other local features (i.e., another local feature included in the same key frame or a local feature included in another key frame), and it may mean a correlation between the local feature and pixels of the surroundings of the local feature.

According to the embodiment, the local feature determination unit 357 may include a pre-learned local feature determination neural network (e.g., Super Point) to output a high-dimensional vector representing the local feature of the input key frame when a key frame is input. In this case, when a key frame is input to the local feature determination neural network, the local feature determination unit 357 may determine the local features using vectors output from the local feature determination neural network.

A method of training the local feature determination neural network included in the local feature determination unit 357 will be described with reference to FIG. 9.

The pose calculation unit 359 may input the local features determined by the local feature determination unit 357 to a preset SLAM algorithm, and calculate the pose information of the key frame and the coordinate information of the local features included in the key frame (e.g., 3D absolute coordinates on the earth).

More specifically, the pose calculation unit 359 may calculate pose information of a key frame by comparing local features included in the key frame with local features included in other key frames in which pose information is predefined.

For each key frame selected or generated by the key frame selection unit 351 and the key frame rotation unit 353, as described above, a global feature, one or more local features and pose information determined by the global feature determination unit 355, the local feature determination unit 357, and the pose calculation unit 359 may be included.

The 3D map generation unit 361 may generate a 3D map by storing the key frame together with global feature, local feature, and pose information corresponding to the key frame. That is, the 3D map generation unit 361 may generate the 3D map using the key frame including the global feature of the key frame, one or more local features included in the key frame, and coordinate information of the local features included in the key frame.

The 3D map generation device 300 may store the generated 3D map in the terminal pose determination device 200 (or database).

Figure 3:
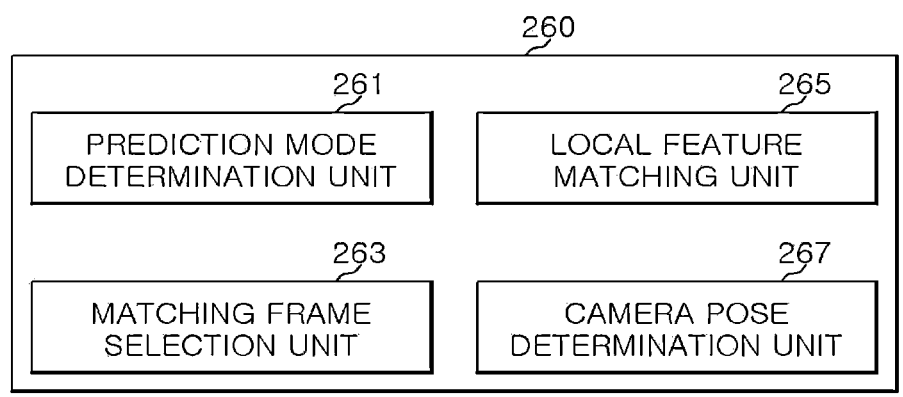
FIG. 3 is a block diagram conceptually illustrating the function of a terminal pose determination model according to an embodiment of the present disclosure.

FIG. 3 is a block diagram conceptually illustrating the function of a terminal pose determination model according to an embodiment of the present disclosure.

Referring to FIGS. 1 and 3, the terminal pose determination model 260 may predict pose information of the user terminal 100 using an image received from the user terminal 100 and a pre-stored 3D map 250.

To this end, the terminal pose determination model 260 may include a prediction mode determination unit 261, a matching frame selection unit 263, a local feature matching unit 265, and a camera pose determination unit 267.

The prediction mode determination unit 261, the matching frame selection unit 263, the local feature matching unit 265, and the camera pose determination unit 267 shown in FIG. 3 are described by conceptually dividing the functions of the terminal pose determination model 260 to easily explain the function of the terminal pose determination model 260, but it is not limited thereto. That is, according to embodiments, functions of the prediction mode determination unit 261, the matching frame selection unit 263, the local feature matching unit 265, and the camera pose determination unit 267 may be merged/separated, and may be implemented as a series of commands included in a program.

The prediction mode determination unit 261 may determine a prediction mode for predicting the pose of the user terminal 100 based on whether or not the pose information of the user terminal 100 in the previous frame is validly predicted.

More specifically, when the pose information of the user terminal 100 in the previous frame is not validly predicted, the prediction mode determination unit 261 may operate in the initial pose estimation mode for predicting the pose information of the camera 120 and the pose information of the user terminal 100 in the previous (previous) frame is validly predicted, the prediction mode determination unit 261 determines the user In a situation where the position of the terminal 100 is known, the terminal pose tracking mode predicts the pose information of the camera 120 included in the user terminal 100, and the pose of the user terminal 100 in the previous (previous) frame. When the information is validly predicted but satisfies a preset condition, the prediction mode determining unit 261 may operate in an intermediate mode in which the initial pose estimation mode and the UE pose tracking mode are combined.

That is, if the pose information of the user terminal 100 in the previous frame was not validly predicted, the terminal pose determination model 260 does not have the correct pose information of the user terminal 100 in the current place, so all of the processes for determining the pose information of the user terminal 100 must be performed. However, if the pose information of the user terminal 100 in the previous frame is validly predicted, the terminal pose determination model 260 may determine the pose information of the user terminal 100 in the current frame using the pose information of the user terminal 100 in the previous frame.

Through this, the terminal pose determination model 260 can reduce the amount of calculation used to determine the pose information of the user terminal 100 and also improve the accuracy of the pose information of the user terminal 100.

When the prediction mode determined by the prediction mode determination unit 261 is the initial pose estimation mode, the matching frame selection unit 263 may determine the global features of the query image received from the user terminal 100 using the previously learned global feature determination neural network. According to the embodiment, the global feature determination neural network may be the same neural network as the neural network included in the global feature determination unit 355.

The matching frame selection unit 263 may compare global features of the query image with global features of a plurality of key frames stored in the 3D map 250, and select one or more key frames having the smallest difference in global features from the query image as the matching frame among the plurality of key frames stored in the 3D map 250. Here, the matching frame may refer to a frame used to determine pose information of the query image through local feature matching with the query image.

That is, the matching frame selection unit 263 may calculate the distance between the global feature of the query image and the global feature of the plurality of key frames stored in the 3D map 250 (e.g., Euclidean distance), and select a predetermined number of key frames in order of the shortest distance as the matching frames.

Figure 5:
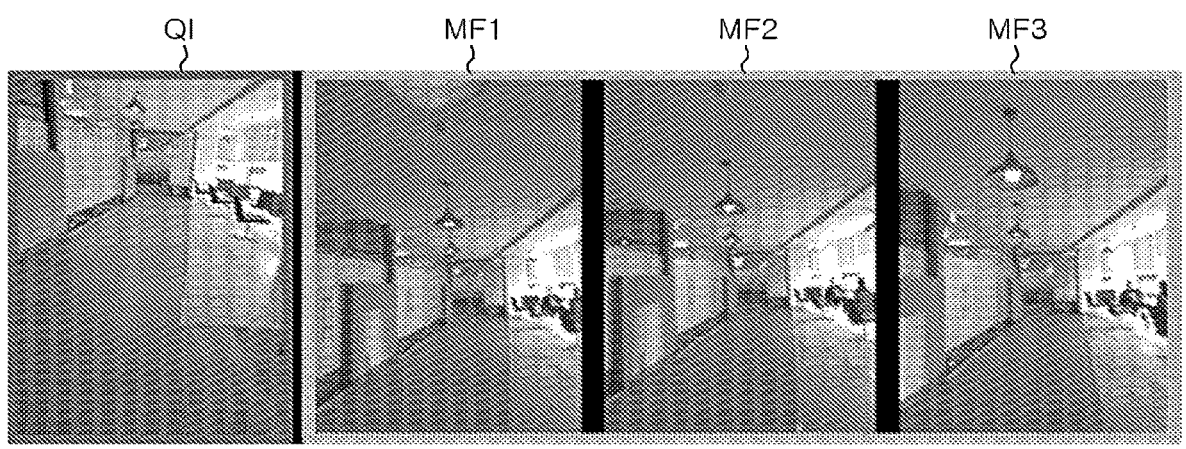
FIG. 5 shows an example of comparing a query image and matching frames according to an embodiment of the present disclosure.

For example, further referring to FIG. 5, the matching frame selection unit 263 may calculate the distance between the global feature of the query image QI and the global feature of a plurality of key frames stored in the 3D map 250, and select predetermined three key frames in the order of the shortest as matching frames MF1, MF2, and MF3.

On the other hand, when the prediction mode determined by the prediction mode determination unit 261 is the terminal pose tracking mode, the matching frame selection unit 263 may select one or more matching frames using pose information of the camera 120 predicted in the previous frame.

In more detail, the matching frame selection unit 263 may select one or more matching frames using Equation 2 below.

$$T_{Relative} = (T_{Prev})^{-1} T_{KeyFrame} \qquad \text{[Equation 2]}$$

Here, $T_{KeyFrame}$ may be a matrix representing the pose information of the camera 120 predicted in the previous frame, $T_{Prev}$ may represent a transformation matrix for determining the pose information of the camera 120 in the current frame using the pose information of the camera 120 in the previous frame, and $T_{Relative}$ may be a matrix representing a change in rotation and position of the camera 120 from the previous frame to the current frame.

That is, the matching frame selection unit 263 may determine the relative pose information $T_{Relative}$ of the camera 120 in the current frame using the pose information $T_{KeyFrame}$ of the camera 120 predicted in the previous frame and the inverse transformation $T_{Prev}^{-1}$ of the transformation matrix $T_{Prev}$.

The matching frame selection unit 263 may select the key frames in which the value obtained by normalizing the relative pose information $T_{Relative}$ (that is, the change in position of the camera 120 from the previous frame to the current frame) is less than or equal to a preset threshold distance, and a change in rotation of the camera 120 from the previous frame to the current frame (e.g., a change in rotation angle when a matrix is expressed as an axis-angle) is less than or equal to a preset threshold angle as matching frames.

Finally, when the prediction mode determined by the prediction mode determination unit 261 is an intermediate mode, in order to compromise between efficiency and accuracy, the matching frame selection unit 263 may select matching frames by combining the initial pose estimation mode and the terminal pose tracking mode.

The preset condition may include at least one of a case that the number of operations in the terminal pose tracking mode is equal to or greater than the threshold value, and a case that the difference (e.g., a distance difference) between the pose information of the camera 120 calculated in the terminal pose tracking mode and the pose information of the camera 120 calculated in the initial pose estimation mode is equal to or greater than a preset threshold value.

That is, even if it is determined that the pose information is validly predicted, if the number of operations in the terminal pose tracking mode is equal to or greater than the threshold value, or if the difference (e.g., a distance difference) between the pose information of the camera 120 calculated in the terminal pose tracking mode and the pose information of the camera 120 calculated in the initial pose estimation mode is equal to or greater than a preset threshold value, since the validity of the predicted pose information cannot be guaranteed, the prediction mode determination unit 261 may select the matching frame by combining the initial pose estimation mode and the terminal pose tracking mode.

More specifically, when the prediction mode determined by the prediction mode determination unit 261 is an intermediate mode, the matching frame selection unit 263 may select one or more frames selected using Equation 2 and the frames selected using the distance difference of the global feature as the matching frame, and at this time, the number of frames selected using the distance difference of the global feature may be less than the number of matching frames selected in the initial pose estimation mode.

As described above, since the matching frame selection unit 263 selects a matching frame by dividing the prediction mode of the user terminal 100, the matching frame selection unit 263 may reduce the amount of computation required to select a matching frame to perform local feature matching with the query image.

Thereafter, the local feature matching unit 265 may extract one or more local features from the query image, and may perform local feature matching that matches the local features extracted from the query image with the local features included in the matching frame selected by the matching frame selection unit 263.

The local feature matching unit 265 may perform the local feature matching and calculate a distance between a local feature included in the query image and a local feature included in the matching frame (e.g., Euclidean distance). The distance between the local feature included in the query image and the local feature included in the matching frame means the similarity between the local feature included in the query image and the local feature included in the matching frame, and it may be a distance between a local feature descriptor and a local feature descriptor included in the matching frame (i.e., similarity).

Figure 6:
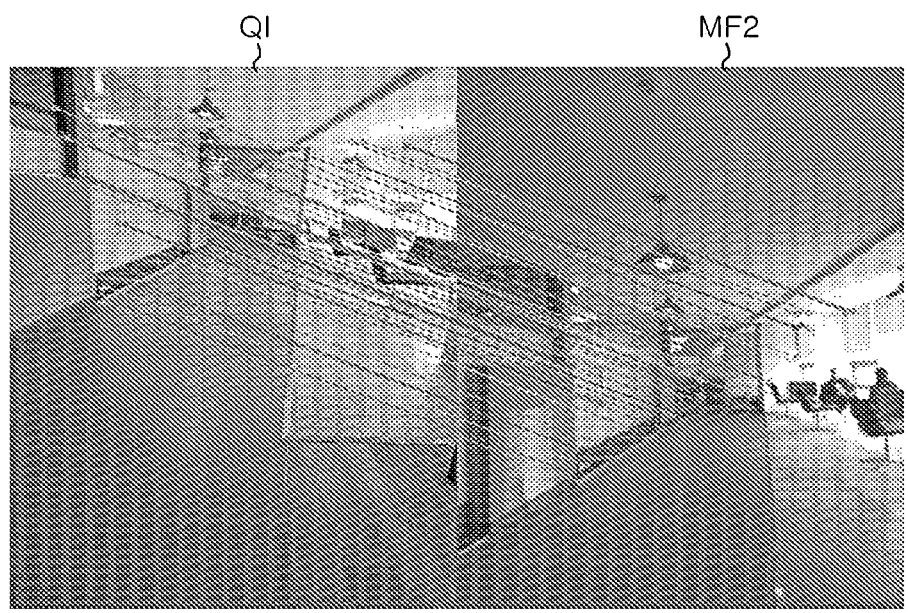
FIG. 6 illustrates an example of matching local features included in a query image with local features included in a matching image according to an embodiment of the present disclosure.

For example, further referring to FIG. 6, the local feature matching unit 265 may calculate a distance between all local features included in the query image QI and all local features included in the second matching frame MF2, and perform the local feature matching by matching the local feature with the shortest distance.

Meanwhile, due to errors in the local feature matching process, the local feature matching unit 265 may erroneously match local features. Therefore, in order to reduce matching errors, the local feature matching unit 265 may determine the validity of local feature matching based on a difference in distance between a local feature included in a query image and a local feature included in matching frames.

More specifically, if a ratio of a first distance having the shortest distance among the local features included in the query image and the local features included in the matching frames, to a second distance having the second shortest distance among the local features included in the query image and the local features included in the matching frames, is equal to or less than (less than) a predetermined threshold value, the local feature matching unit 265 may determine that the matching result is valid.

On the other hand, if the ratio of the first distance to the second distance is grater than (or equal to or greater than) a predetermined threshold value, the local feature matching unit 265 may determine that the result of local feature matching is invalid, and may perform again the local feature matching between the query image and matching frames.

This is because matching frames are key frames that have the most similar global features with the query image, and matching frames are images that are similar to each other or at least have no significant difference. That is, since the matching frames are similar to each other, it can be expected that there is no significant difference in local feature matching between the query image and the matching frames, and if there is there is a significant difference in local feature matching between each query image and each matching frames for each matching frame, it can be assumed that the matching between local features has been performed incorrectly.

In addition, numerous local features may be included in the query image depending on the location and direction of the user terminal 100. At this time, the local feature matching unit 265 may perform local feature matching as much as (the number of local features included in the query image*the number of local features included in the matching frame*the number of matching frames), and if the pose information is determined using all matched pairs, the amount of calculation performed by the camera pose determination unit 267 may increase.

Therefore, in order to reduce the amount of computation for local feature matching, the local feature matching unit 265 may calculate the distance between the local features included in the query image and the local features included in each matching frame and matched, may select a predetermined number of local features in order of the shortest distance from the local features included in the matching frame and matched among the local features included in the query image, and may determine pose information to be performed by the camera pose determining unit 267 using the selected local features among the local features included in the query image.

Figure 7:
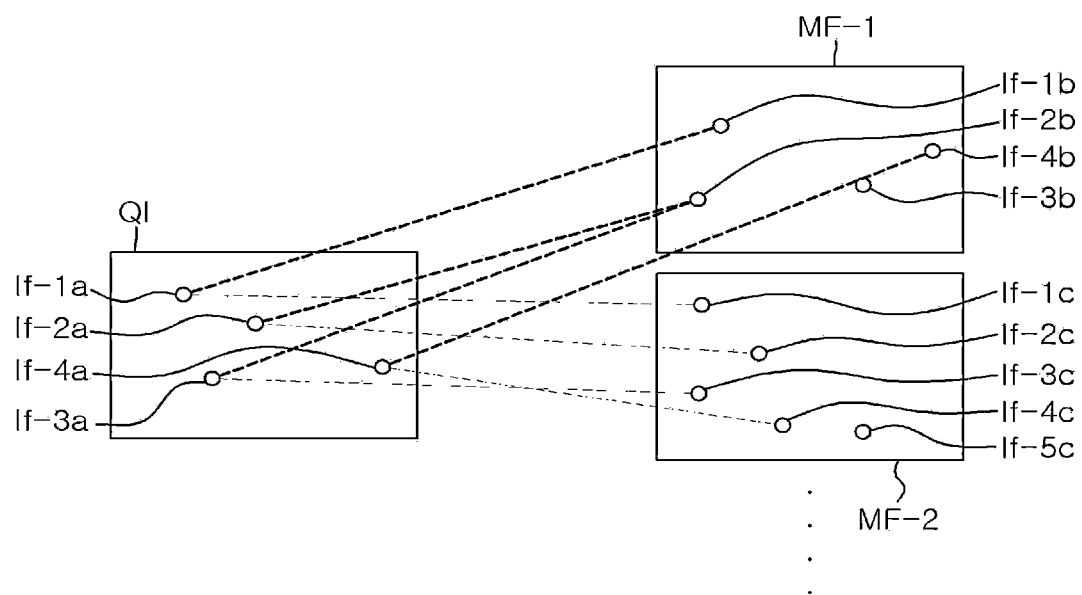
FIG. 7 illustrates a method of finding a local feature pair by matching a local feature included in a query image with a local feature included in a matching frame according to an embodiment of the present disclosure.

FIG. 7 illustrates a method of matching local features included in a query image with local features included in a matching frame according to another embodiment of the present disclosure.

For example, referring to FIG. 7, the local feature matching unit 265 may determine the local feature with the shortest distance from N matching frames MF-, MF-2, . . . for the local features lf-1a, lf-2a, lf-3a, and lf-4a of the query image QI as local feature pairs. Subsequently, the local feature matching unit 265 may arrange a plurality of local feature pairs in descending order of distance and select a predetermined number of local feature pairs from among the plurality of local feature pairs, thereby reducing the amount of computation performed by the camera pose determination unit 267.

For example, the local feature matching unit 265 may match the local feature lf-1b of the first matching frame MF-1 closest to lf-1a among the local features of the query image QI as a first local feature pair. Subsequently, the local feature matching unit 265 may match the local feature lf-2b of the first matching frame MF-1 closest to lf-2a among the local features of the query image QI as a first local feature pair. The local feature matching unit 265 may repeat matching to match all local features of the query image QI with local features of the N matching frames MF-1, MF-2, . . . , to obtain a plurality of local feature pairs.

In the embodiment, the plurality of local feature pairs may be (lf-1a, lf-1b), (lf-1a, lf-1c), (lf-2a, lf-2b), (lf-2a, lf-2c), (lf-3a, lf-2b), (lf-3a, lf-3c), (lf-4a, lf-4b) and (lf-4a, lf-4c).

Subsequently, the local feature matching unit 265 may arrange a plurality of local feature pairs in descending order of distance, and may select a predetermined number of local feature pairs from among the plurality of local feature pairs. For example, if the predetermined number is 4 and the results of arranging a plurality of local feature pairs in descending order of distance are (lf-1a, lf-1b), (lf-4a, lf-4b), (lf-1a, lf-1c), (lf-2a, lf-2c), (lf-3a, lf-3c), (lf-3a, lf-2b), the local feature matching unit 265 may select (lf-4a, lf-4c), (lf-2a, lf-2b), the local feature matching unit 265 performs (lf-1a, lf-1b), (lf-4a, lf-4b), (lf-1a, lf-1c) and (lf-2a, lf-2c) as the pose determination local feature pairs.

Through this method, since the number of local feature pairs used by the camera pose determination unit 267 to determine the pose is reduced, the amount of computation performed when determining the pose can be reduced, and the probability that the wrong matching pair can be used to determine the pose information can be reduced.

Figure 8A:
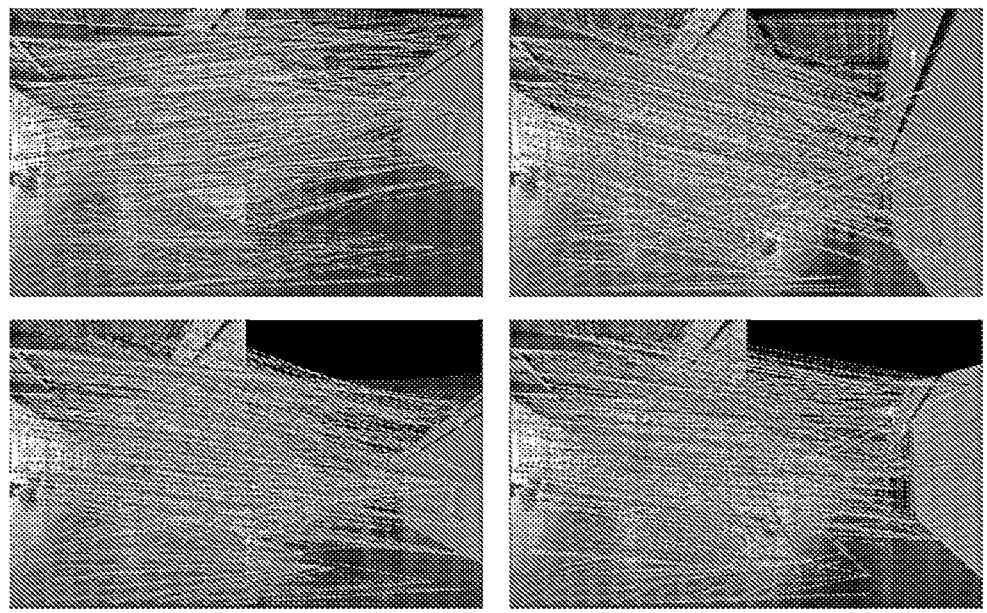
FIGS. 8A and 8B show an example of performing local feature matching only on local feature pairs limited by a predetermined number in order of shortest distances among a plurality of local feature pairs for local features having the shortest distance between local features included in a query image and local features included in a matching frame.
Figure 8B:
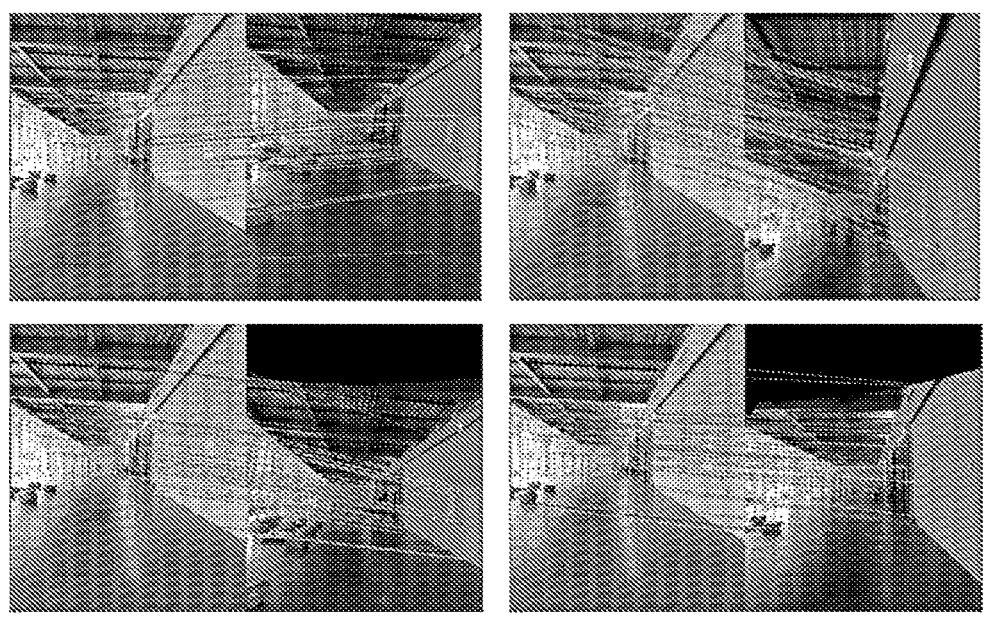

For example, further referring to FIGS. 8A and 8B, FIG. 8A shows a result of performing local feature matching on all local features included in the query image, and FIG. 8B shows a result of performing local feature matching only on local feature pairs limited by a predetermined number in order of the short distances among a plurality of local feature pairs for local features having the shortest distance between the local features included in the query image and local features included in the matching frame and included in the matched query image.

That is, as shown in FIGS. 8A and 8B, since the number of local feature pairs used by the camera pose determination unit 267 to determine the pose is reduced, not only the amount of computation for pose determination can be reduced, but also the probability that the incorrect local feature matching pair is used to determine the pose can be reduced.

The camera pose determining unit 267 may determine pose information of the query image by using a pose determination local feature pair between the query image and matching frames.

In more detail, the camera pose determination unit 267 may determine pose information of the query image by using 2-dimensional coordinates (i.e., coordinates on the query image) of local features included in the query image and 3-dimensional coordinates of the matched local feature (i.e., 3D absolute coordinates on the earth of the local feature).

For example, the camera pose determining unit 267 may predict pose information of a query image (i.e., pose information of the camera 120 when the query image is captured), by inputting 2-dimensional coordinates of local features included in the query image (i.e., coordinates on the query image) and 3-dimensional coordinates of local features included in the matching frame and matched (i.e., 3D absolute coordinates on the earth of the local feature) into a pose prediction algorithm (e.g., P3P algorithm).

In addition, the camera pose determination unit 267 may determine the number of correctly matched local features among the local feature matching between the query image and the matching image by using an error elimination algorithm (e.g., RANdom SAmple Consensus (RANSAC) algorithm).

When the number of correctly matched local features among the local feature matching between the query image and the matching image is equal to or greater than (or greater than) a preset threshold value, the camera pose determination unit 267 may recognize the pose information of the query image predicted based on the pose prediction algorithm as valid information, and determine the predicted pose information as the pose information of the query image.

On the other hand, when the number of correctly matched local features among the local feature matching between the query image and the matching image is less than (or equal to or less than) a preset threshold value, the camera pose determination unit 267 may recognize the pose information predicted based on the pose prediction algorithm as invalid information, and determine again the pose information of the query image by resetting the prediction mode.

The terminal pose determination model 260 may transmit pose information of the determined query image to the user terminal 100.

At this time, according to the embodiment, the terminal pose determination model 260 may transmit information on whether or not the pose information is validly predicted, and the number of times the terminal has operated in the pose tracking mode (e.g., continuous or non-continuous number of times), along with the pose information of the query image.

The number of times the terminal operates in the pose tracking mode may be initialized under the control of the prediction mode determination unit 261. For example, the prediction mode determination unit 261 may initialize the number of times when the prediction mode operates as an intermediate mode or an initial pose estimation mode.

Figure 9:
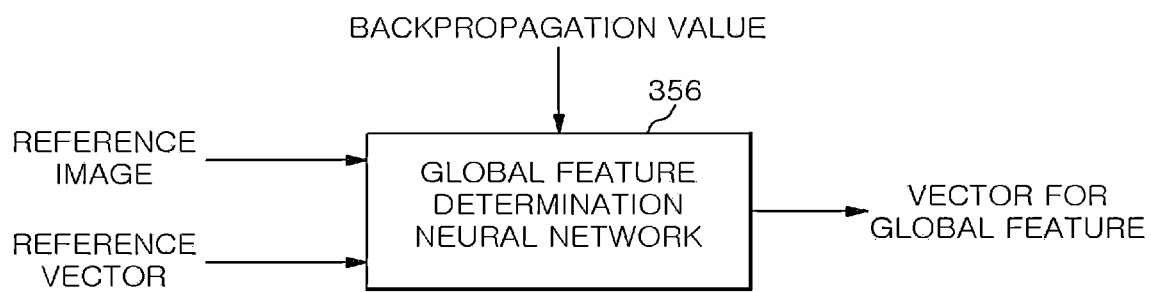
FIG. 9 is a block diagram illustrating a method of training a global feature determination neural network according to an embodiment of the present disclosure.

FIG. 9 is a block diagram illustrating a method of training a global feature decision neural network according to an embodiment of the present disclosure.

Referring to FIGS. 2 and 9, the global feature determination neural network 356 included in the global feature determination unit 355 may be trained to output a vector for distinguishing an image from other images if an image (e.g., a key frame used to generate the 3D map 250) is inputted.

In more detail, the global feature determination neural network 356 may be trained to output a high-dimensional vector as a global feature for the reference image when it receives a reference image as input data and a reference vector as label data for the input.

In addition, the global feature determination neural network 356 may be trained by further receiving a backpropagation value for reducing the difference between the reference vector and the output high-dimensional vector as feedback.

Figure 10:
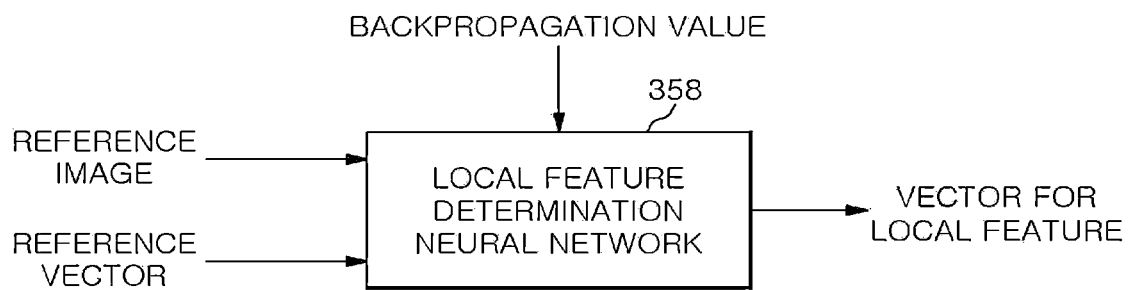
FIG. 10 is a block diagram illustrating a method of training a local feature determination neural network according to an embodiment of the present disclosure.

FIG. 10 is a block diagram illustrating a method of learning a local feature determination neural network according to an embodiment of the present disclosure.

Referring to FIGS. 2 and 10, when the local feature determining neural network 358 included in the local feature determining unit 357 may be trained to output a high-dimensional vector representing the local features contained in the image if an image (e.g., a key frame used to generate the 3D map 250) is inputted.

More specifically, when the local feature determination neural network 358 receives a reference image as input data and a reference vector for local features included in the reference image as label data for the input, the local feature decision neural network 358 may be trained to output a high-dimensional vector for the local feature included in the reference image.

In addition, as feedback, the local feature determination neural network 358 may be trained by further receiving a backpropagation value for reducing the difference between the reference vector and the output high-dimensional vector.

Figure 11:
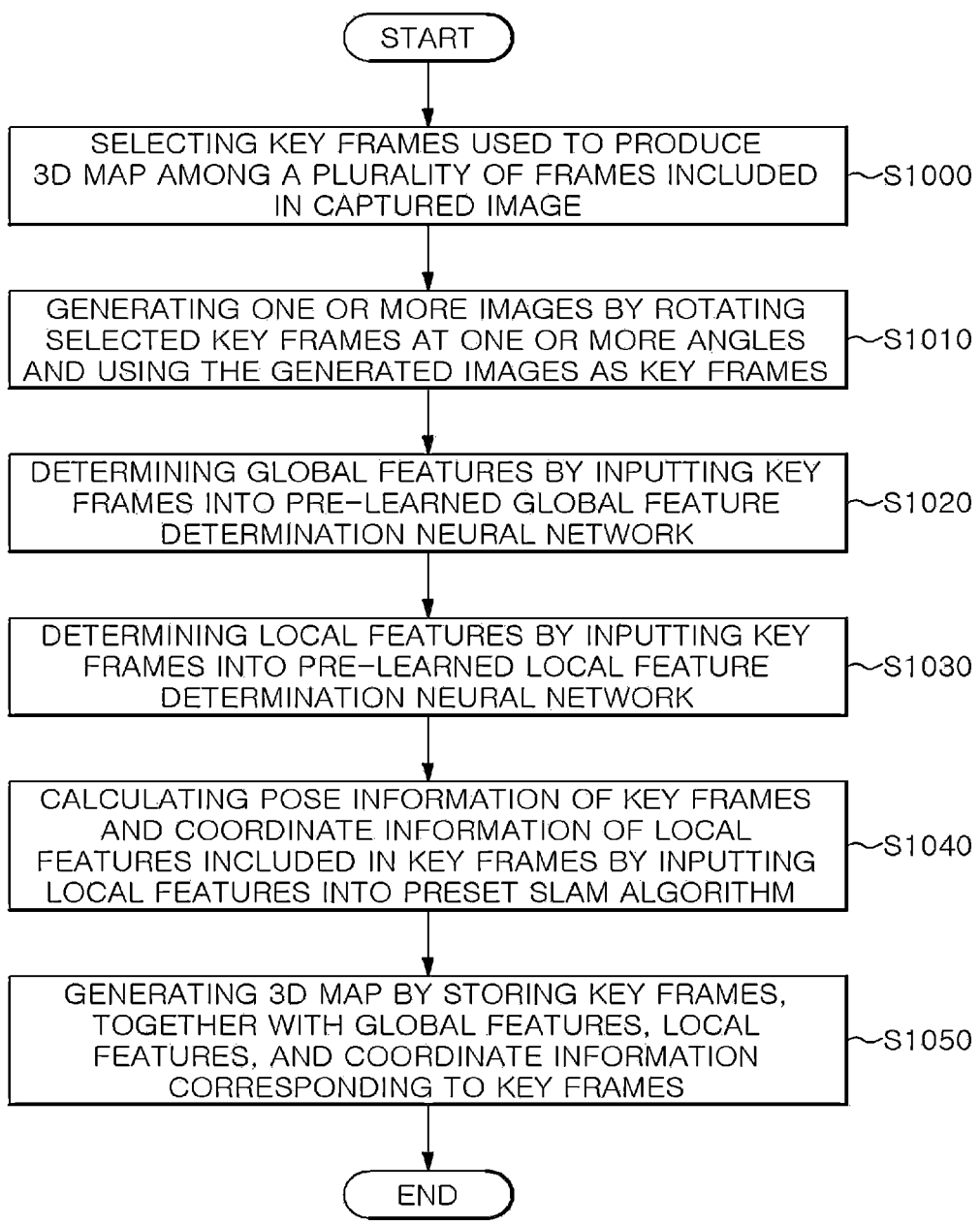
FIG. 11 is a flowchart illustrating a method of generating a 3D map according to an embodiment of the present disclosure.

FIG. 11 is a flowchart illustrating a method of generating a 3D map according to an embodiment of the present disclosure.

Referring to FIGS. 2 and 11, the key frame selection unit 351 may select key frames used to produce a 3D map from a plurality of frames included in an image captured using the camera unit 320 based on a predetermined criterion (S1000), and the key frame rotation unit 353 may generate one or more images by rotating the key frames selected by the key frame selection unit 351 at one or more angles and use the generated image as the key frame (S1010).

When a key frame is input to the pre-learned global feature determination neural network, the global feature determination unit 355 may determine a global feature from a vector output from the global feature determination neural network (S1020).

When a key frame is input to the pre-learned local feature determination neural network, the local feature determination unit 357 may determine the local features using vectors output from the local feature determination neural network (S1030).

The pose calculation unit 359 may input the local features determined by the local feature determination unit 357 to the preset SLAM algorithm, and may calculate pose information of a key frame and coordinate information of local features included in the key frame (e.g., 3D absolute coordinates on the earth) (S1040).

The 3D map generation unit 361 may generate the 3D map 250 by storing the key frame together with global features, local features, and coordinate information corresponding to the key frame (1050).

Figure 12B:
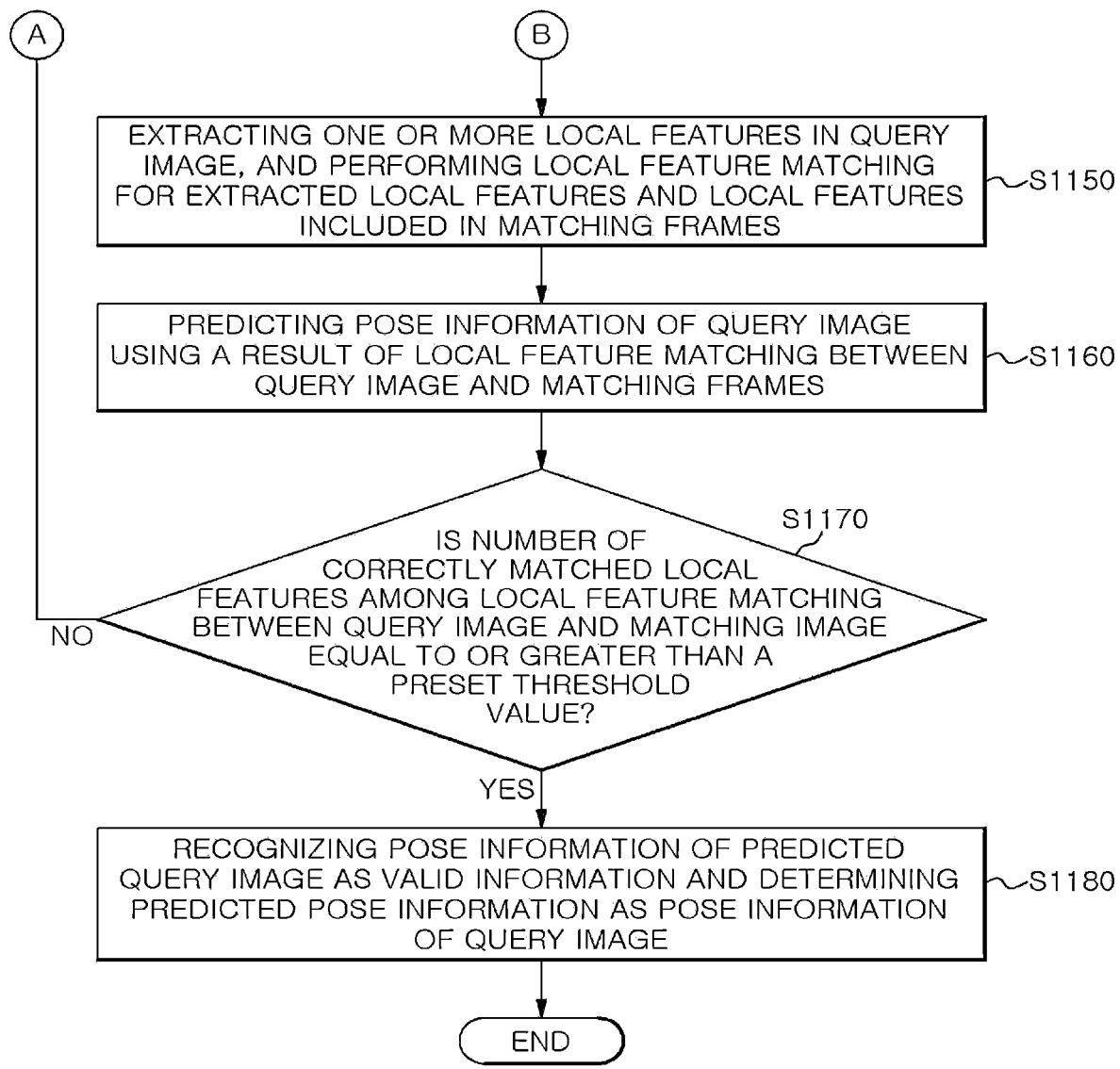

FIGS. 12A and 12B are flowcharts illustrating a method of generating a 3D map included in a user terminal according to an embodiment of the present disclosure.

Referring to FIGS. 2, 12A and 12B, the prediction mode determination unit 261 may determine a prediction mode to predict the pose of the user terminal 100 based on whether or not the pose information of the user terminal 100 in the previous frame is validly predicted.

When the prediction mode determined by the prediction mode determination unit 261 is the initial pose estimation mode, the matching frame selection unit 263 may determine the global feature of the query image received from the user terminal 100 using the previously learned global feature determination neural network (S1110), and may select one or more key frames having the smallest difference between the query image and global features as the matching frame among a plurality of key frames stored in the 3D map 250 by comparing the global features of the query image with global features of a plurality of key frames stored in the 3D map 250 (S1120).

On the other hand, when the prediction mode determined by the prediction mode determination unit 261 is the terminal pose tracking mode, the matching frame selection unit 263 may select one or more matching frames using pose information of the camera 120 predicted in the previous frame (S1130).

Finally, when the prediction mode determined by the prediction mode determination unit 261 is the intermediate mode, the matching frame selection unit 263 may select one or more frames selected by using the pose information of the camera 120 predicted in the previous frame, and the frame selected by using the distance difference of the global features as matching frames (S1140).

Thereafter, the local feature matching unit 265 may extract one or more local features from the query image, and may perform local feature matching that matches the local features extracted from the query image with the local features included in the matching frame selected by the matching frame selection unit 263 (S1150).

The camera pose determination unit 267 may predict pose information of the query image using a result of local feature matching between the query image and matching frames (S1160).

If the number of correctly matched local features among the local feature matching between the query image and the matching image is equal to or greater than (or greater than) a preset threshold value ('Yes' in S1170), the camera pose determination unit 267 may recognize the pose information of the query image predicted based on the pose prediction algorithm as valid information, and determine the predicted pose information as the pose information of the query image (S1180).

On the other hand, if the number of correctly matched local features among the local feature matching between the query image and the matching image is less than (or equal to or less than) a predetermined threshold value ('No' in S1170), the camera pose determination unit 267 may recognize the pose information of the query image predicted based on the pose prediction algorithm as invalid information, and the prediction mode determination unit 261 may determine again the pose information of the query image by resetting the prediction mode.

Each flowcharts of the present disclosure can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the steps of the flowchart. These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts. The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each step in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method of determining a pose of a camera included in a user terminal, comprising:
   receiving a first query image captured by the camera of the user terminal in a first pose;
   extracting local feature descriptors of the first query image using a feature extraction algorithm;
   determining whether a number of extracted local feature descriptors that match local feature descriptors of a matching key frame in a three-dimensional (3D) map is equal to or greater than a threshold;
   determining a prediction mode for predicting a second pose of the user terminal subsequent to the first pose and in which a second query image is captured by the camera based on the number; and
   determining the second pose based on the determined prediction mode.

2. The method of claim 1, wherein the determining of the second pose comprises:
   when the number is equal to or greater than the threshold, selecting one or more matching frames from among a plurality of key frames in the 3D map, as matching candidates for the second query image.

3. The method of claim 2, wherein the determining of the second pose further comprises:
   when the number is equal to or greater than the threshold, performing local feature matching between first-local features extracted from the second query image and local features in the selected one or more matching frames; and
   determining the second pose of the second query image further based on a result of the local feature matching.

4. The method of claim 1, wherein the determining of the second pose comprises:
   when the number is lower than the threshold:
   determining global features of the second query image using a pre-learned neural network; and
   selecting one or more matching frames from a plurality of key frames in the 3D map as matching candidates by comparing the global features of the second query image with global features of each of the plurality of key frames.

5. The method of claim 1, wherein the determining of the second pose comprises:
   when the number is equal to or greater than the threshold but satisfies a preset condition, selecting one or more frames from a plurality of key frames in the 3D map as matching frames by comparing global features of the second query image determined using a pre-learned neural network with global features of each of the plurality of key frames, and wherein the preset condition comprises:
a distance difference between the second pose determined according to the prediction mode and the first pose is equal to or greater than a preset threshold distance.

6. The method of claim 1, wherein the determining of the second pose comprises:
when the number is equal to or greater than the threshold:
selecting one or more key frames in the 3D map as matching-images having local feature descriptors that match local feature descriptors of the second query image; and
determining the second pose of the second query image by using local feature matching between local features in the one or more matching images and local features in the second query image, and
wherein the 3D map is generated using a plurality of key frames selected from images according to a predetermined criterion, the images captured by a location capturing device or a terminal pose determining device, and
the predetermined criterion includes at least one of a time interval and a moving distance of the location capturing device or the terminal pose determining device.

7. The method of claim 6, wherein the 3D map is generated by further using an image generated by rotating at least one of the plurality of key frames at one or more angles.

8. The method of claim 1, wherein the determining of the second pose comprises:
when the number is equal to or greater than the threshold:
performing local feature matching between first local features extracted from the second query image and second local features included in the 3D map; and
determining the second pose of the second query image using a result of the local feature matching, and
wherein when calculating a distance between the first local features and local features in each of key frames in the 3D map matching each of the first local features.

9. The method of claim 8, wherein the performing local feature matching comprises:
performing the local feature matching only for a predetermined number of matching pairs of the first local features and the second local features with shortest distances.

10. The method of claim 1, further comprising:
obtaining, from the user terminal, information on whether the number is equal to or greater than the threshold, information of the first pose-, information on a last pose of the user terminal predicted when a previous query image resulted in a number of extracted local feature descriptors that match local feature descriptors of a matching key frame in the map is fewer than the threshold, and a number of images that resulted in a number of extracted local features that match local feature descriptors of a matching key frame equal to or greater than the threshold, together with the second query image.

11. The method of claim 1, further comprising:
obtaining, from the user terminal, information on whether the second pose had a number of extracted local feature descriptors that match local feature descriptors of a matching key frame in the (3D) map equal to or greater than the threshold.

12. A device for determining a pose of a user terminal, comprising:
a transceiver configured to receive a first query image captured by a camera of the user terminal; and
a processor configured to:
extract local feature descriptors of the first query image using a feature extraction algorithm;
determine whether a number of extracted local feature descriptors that match local feature descriptors of a matching key frame in a three-dimensional (3D) map is equal to or greater than a threshold;
determine a prediction mode for predicting a second pose of the user terminal subsequent to the first pose and in which a second query image is captured by the camera based on the number; and
determine the second pose based on the determined prediction mode.

13. The device of claim 12, wherein when the number is equal to or greater than the threshold, the processor is further configured to select one or more matching frames from a plurality of key frames in the 3D map, as matching candidates for the second query image.

14. The device of claim 12, wherein when the number is lower than the threshold, the processor is further configured to:
determine global features of the second query image using a pre-learned neural network, and
select one or more matching frames from among a plurality of key frames in the 3D image as matching candidates by comparing the global features of the second query image with global features of each of the plurality of key frames.

15. The device of claim 12, wherein when the number is equal to or greater than the threshold but satisfies a preset condition, the processor is further configured to select one or more frames from a plurality of key frames in the 3D map as matching frames by comparing global features of the second query image determined using a pre-learned neural network with global features of each of the plurality of key frames, and
wherein the preset condition comprises; a distance difference between the second pose determined according to the prediction mode and the first pose is equal to or greater than a preset threshold distance.

16. A non-transitory computer-readable storage medium for storing instructions thereon, the instructions when executed by one or more processors cause the one or more processors to:
receive a first query image captured by a camera of a user terminal in a first pose;
extract local feature descriptors of the first query image using a feature extraction algorithm;
determine whether a number of extracted local feature descriptors that match local feature descriptors of a matching key frame in a three-dimensional (3D) map is equal to or greater than a threshold;
determine a prediction mode for predicting a second pose of the user terminal subsequent to the first pose and in which a second query image is captured by the camera based on the number; and
determine the second pose based on the determined prediction mode.

* * * * *